(12) United States Patent
Hill et al.

(10) Patent No.: US 6,788,530 B2
(45) Date of Patent: Sep. 7, 2004

(54) USER FRIENDLY COMPUTER EQUIPMENT, MONITOR UNIT, AND MONITOR UNIT SETTING BASE

(75) Inventors: David Wayne Hill, Cary, NC (US); John Peter Karidis, Ossining, NY (US); Tomoyuki Takahashi, Fujisawa (JP); Kenichi Tanaka, Sagamihara (JP); Hideyuki Usui, Chigasaki (JP); Kazuhiko Yamazaki, Hiratuska (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/253,160

(22) Filed: Sep. 24, 2002

(65) Prior Publication Data

US 2004/0057197 A1 Mar. 25, 2004

(51) Int. Cl.$^7$ ................................................ H05K 5/00
(52) U.S. Cl. ........................ 361/683; 353/122; 345/905; 248/923
(58) Field of Search ................................ 361/680–687, 361/724–727; 353/119–122; 345/169, 905, 92; 16/342, 337; 248/917–924; 349/58

(56) References Cited

U.S. PATENT DOCUMENTS

| | | | | |
|---|---|---|---|---|
| 6,392,871 | B1 | * 5/2002 | Yanase | 361/681 |
| 6,430,038 | B1 | * 8/2002 | Helot et al. | 361/681 |
| 6,636,181 | B2 | * 10/2003 | Asano et al. | 343/702 |
| 6,654,234 | B2 | * 11/2003 | Landry et al. | 361/681 |
| 2003/0063059 | A1 | * 4/2003 | Farrow et al. | 345/92 |

\* cited by examiner

*Primary Examiner*—Hung Van Duong
(74) *Attorney, Agent, or Firm*—Daniel E. McConnell

(57) ABSTRACT

A notebook type PC, for easier use by a user, including a liquid crystal monitor unit, a mainframe section, and an arm for connecting the liquid crystal monitor unit to the mainframe section, is provided. One end of the arm is connected to the liquid crystal monitor unit by a rotatable first hinge. The other end of the arm is connected to the mainframe section by a rotatable second hinge. The angle and distance of the liquid crystal monitor unit with respect to the mainframe section can be set freely by the first hinge and the second hinge.

4 Claims, 9 Drawing Sheets

[Figure 1]
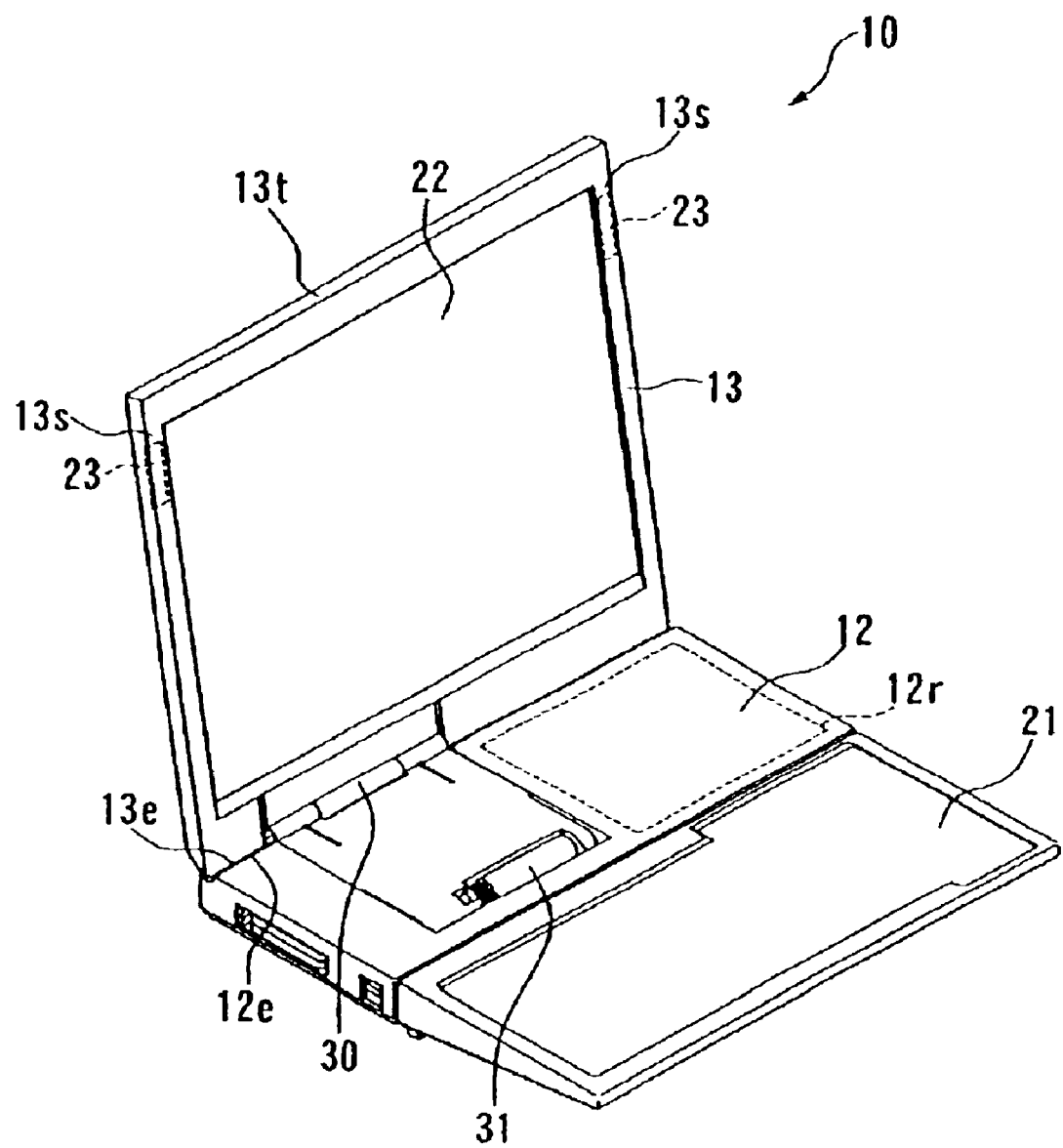

[Figure 2]
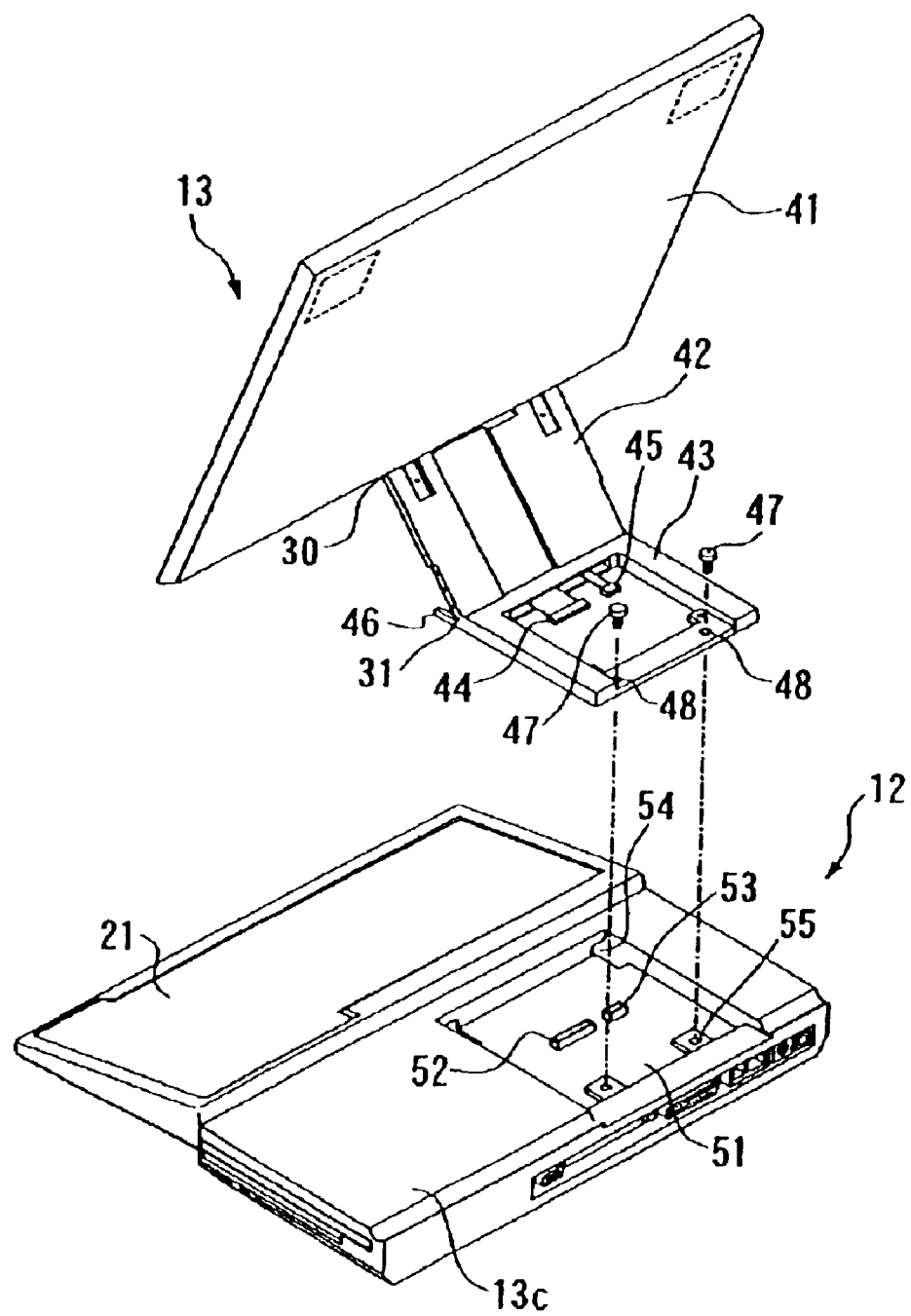

[Figure 3]
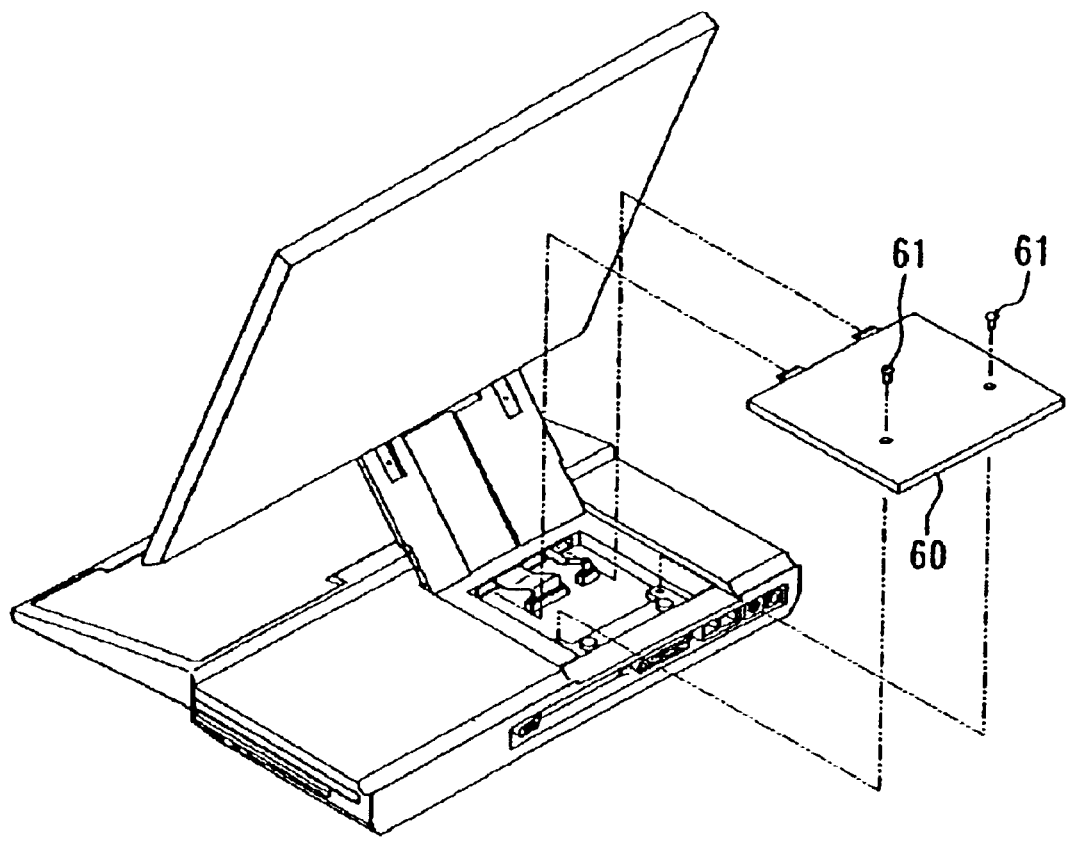

[Figure 4]
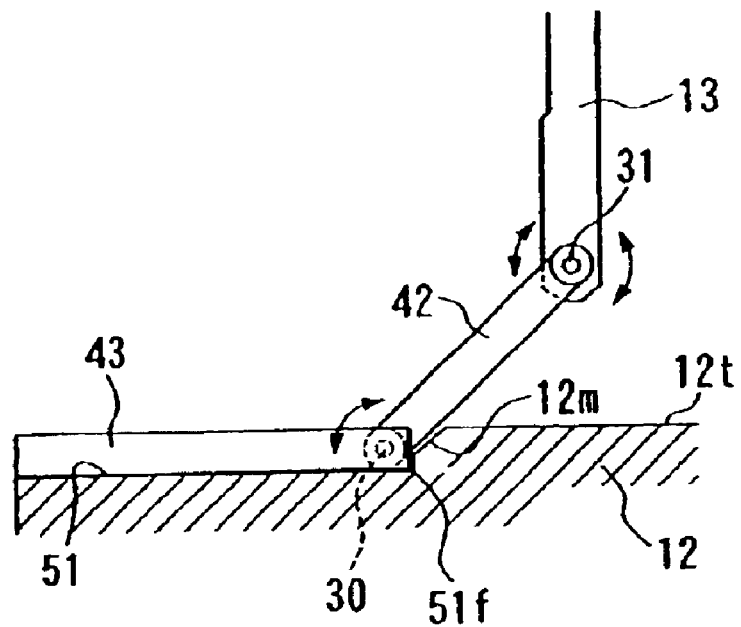

[Figure 5]
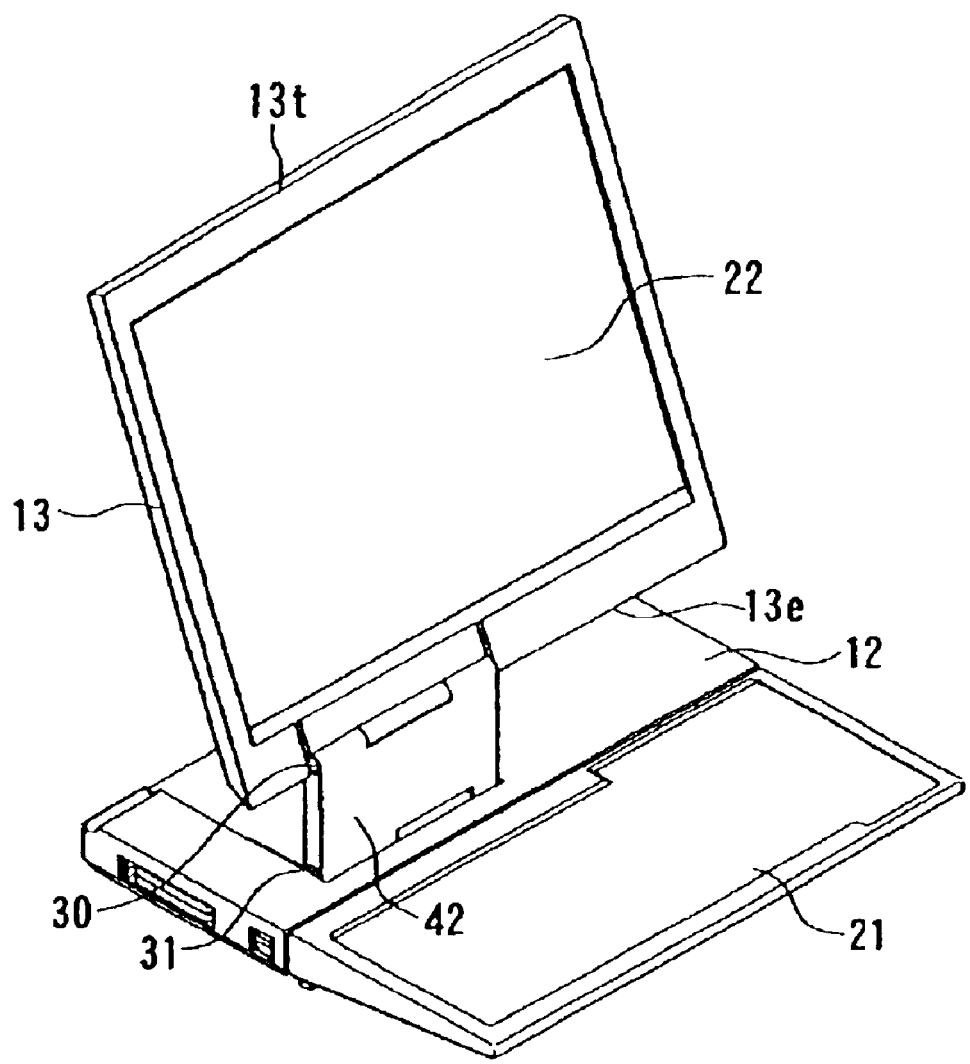

[Figure 6]
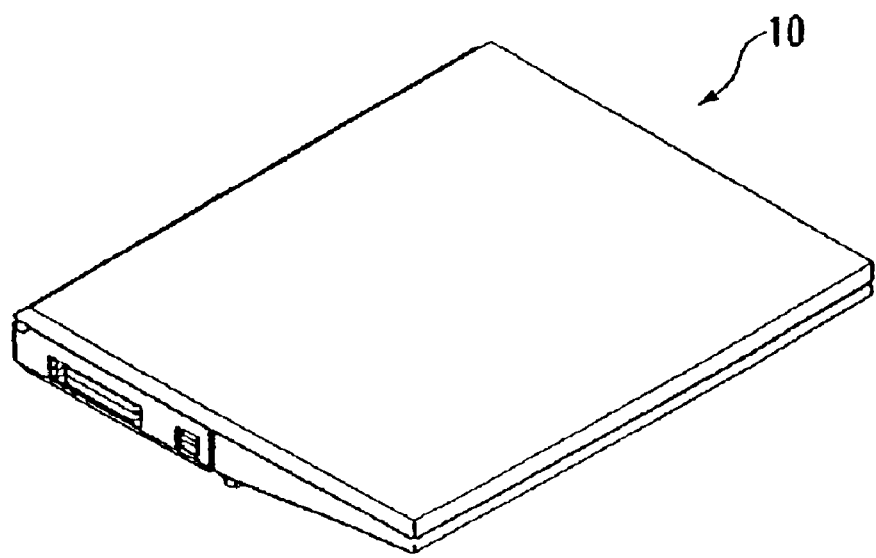

[Figure 7]
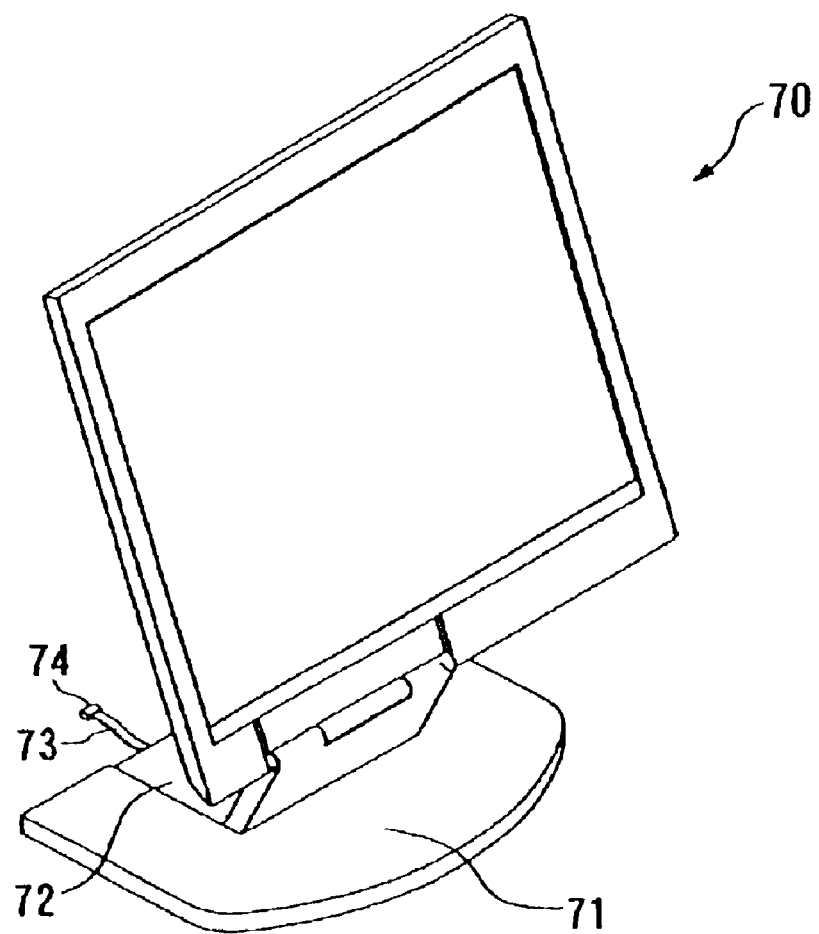

[Figure 8]
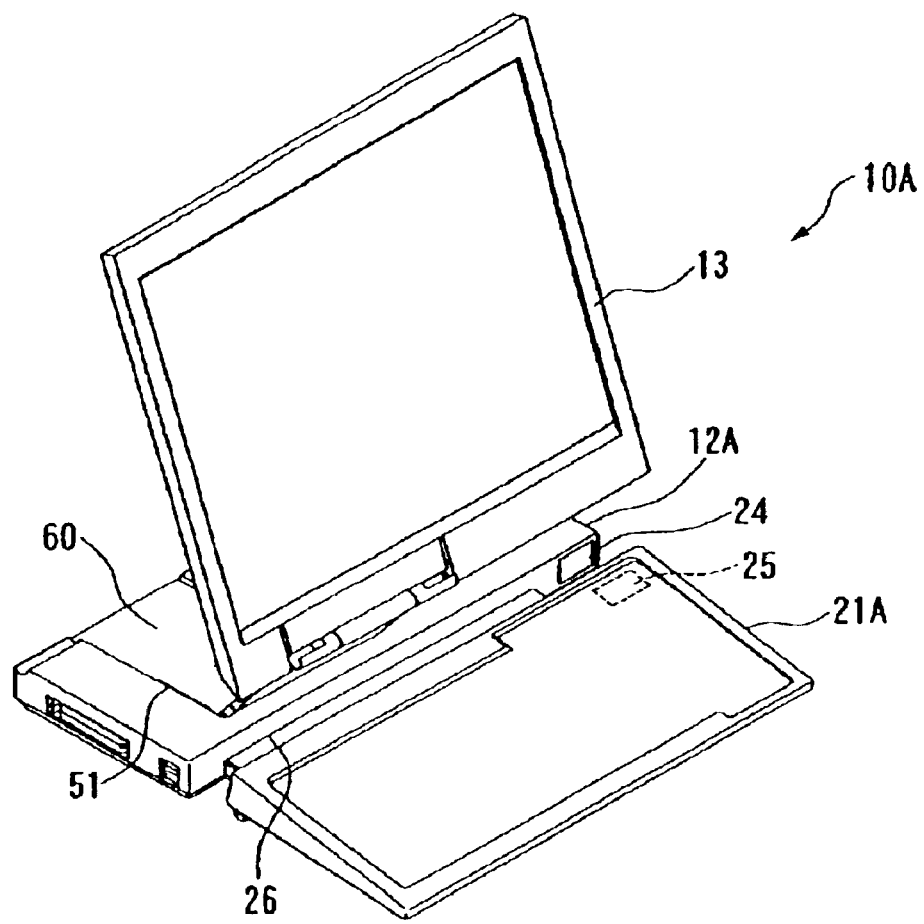

[Figure 9]
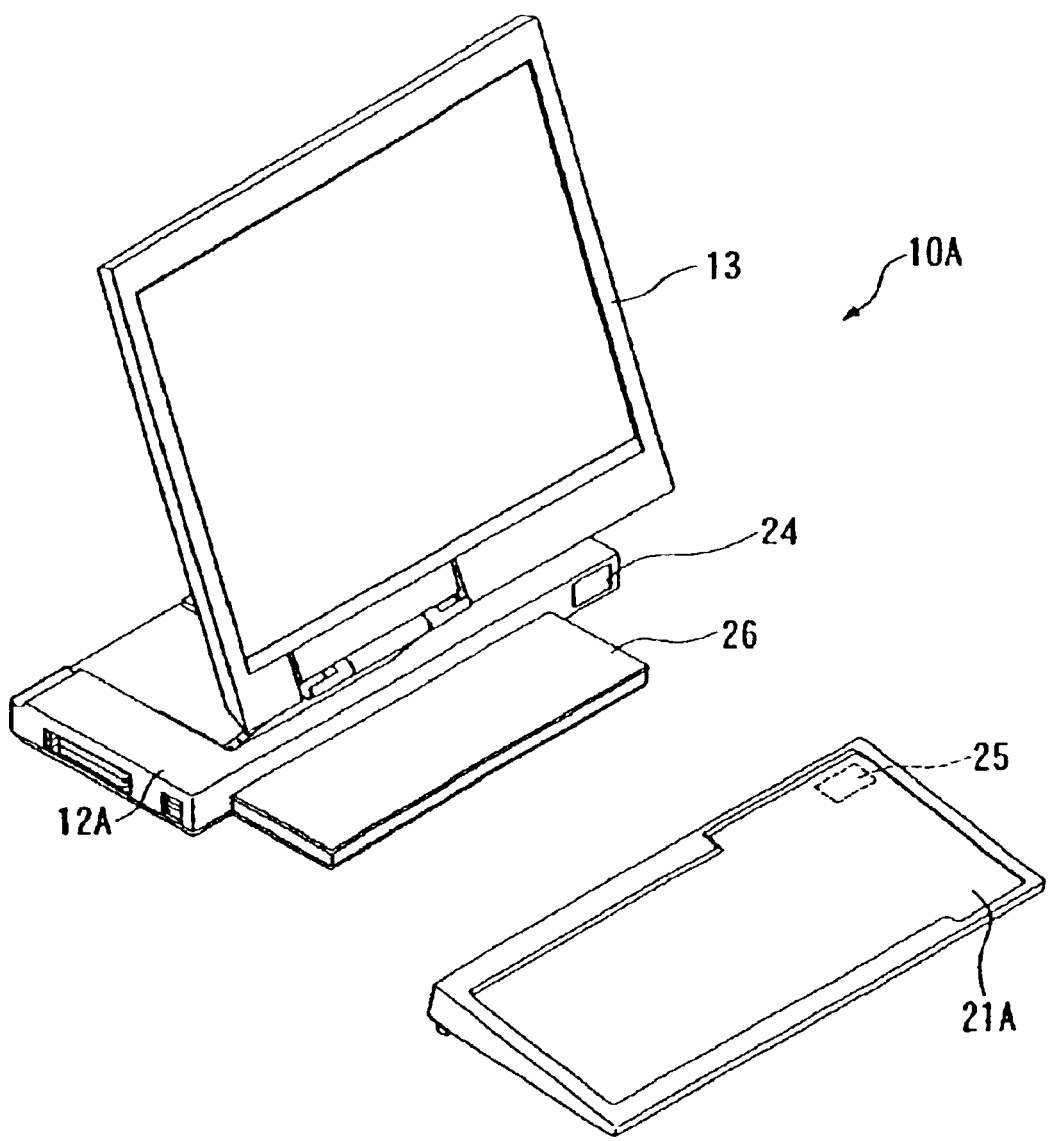

USER FRIENDLY COMPUTER EQUIPMENT, MONITOR UNIT, AND MONITOR UNIT SETTING BASE

BACKGROUND OF THE INVENTION

1. Field of the Invention

The present invention relates, in general, to computer equipment which gives increased ease of use to a user.

2. Description of Related Art

Conventionally, computer equipment, such as a notebook type PC (Personal Computer), which is small in size and has high portability, has been used widely. Such a notebook type PC is often made up of a mainframe section including a keyboard and a liquid crystal monitor unit connected to the mainframe section so as to be openable. The liquid crystal monitor unit is stored so as to cover the keyboard of the mainframe section when the notebook type PC is stored. Also, when the notebook type PC is used, the liquid crystal monitor unit is raised and the keyboard of the mainframe section and thereby the screen of the liquid crystal monitor unit are exposed.

Although the portable notebook type PC is sometimes used in place at a predetermined setting, it is typically moved and used in various places commensurate with its portability. For example, it is sometimes used in a place where the user has gone out of the office location, or sometimes in a transportation facility used for arriving at the destination.

However, when the notebook type PC is used at the destination or during transportation, there is often insufficient space for placing the PC in a work area that is convenient for the user. For example, in a reserved seat on a train, the space for placing the notebook type PC is a small table provided on the back of the front seat. However, the space between the table and the front seat is narrow, so that the liquid crystal monitor unit cannot be opened completely. Therefore, it is difficult for the user to see the whole of screen of the liquid crystal monitor unit. On the other hand, if the notebook type PC is made smaller so as to be placed in a small space, the ease of use is jeopardized. Therefore, there has been demanded the emergence of a notebook type PC capable of being used in various places, such that the user can see the screen of the liquid crystal monitor unit even in a tight space.

For the ordinary PC, the mainframe section and the liquid crystal monitor unit are separately constructed and are connected to each other by a connection cord. Therefore, the mainframe section and the liquid crystal monitor unit can be combined with a separate liquid crystal monitor unit or mainframe section. For example, a new liquid crystal monitor unit with high performance is purchased and combined with the mainframe section, and the liquid crystal monitor unit having been used before can be used by being combined with another mainframe section. However, the conventional notebook type PC is sold in a state such that the mainframe section and the liquid crystal monitor unit are connected to each other in such a manner as to be non-separable from each other. Therefore, it is difficult to separate the mainframe section and the liquid crystal monitor unit from each other and to combine them to another liquid crystal monitor unit or mainframe section. Therefore, the conventional notebook type PC has virtually no flexibility such that the user replaces the liquid crystal monitor unit according to the situation, and uses an arbitrary liquid crystal monitor unit.

SUMMARY OF THE INVENTION

Accordingly, there is a need for an invention that overcomes the problems discussed above. The present invention has been achieved to solve the above technical problems, and accordingly an object thereof is to provide computer equipment which provides great ease of use to a user.

To attain the above object, the present invention provides a computer equipment having a monitor unit provided with a display screen and a main unit including a control section for controlling the display screen, characterized by comprising an arm for supporting the monitor unit relative to the main unit; a first hinge for rotatably connecting the monitor unit to the arm; and a second hinge for rotatably connecting the main unit to the arm. In this invention, since the arm for supporting the monitor unit is connected by two rotatable hinges, the angle of the monitor unit can be changed freely.

In the present invention, the first and second hinges can set the angle which the main unit and the monitor unit make at a predetermined angle.

Also, the main unit of the present invention preferably has a concave portion for storing the arm. This concave portion can be formed at a part in the width direction of the present invention.

Further, the present invention provides computer equipment which is connectable with a monitor unit and portable, characterized by comprising a concave portion capable of storing an arm which is rotatably connected to the monitor unit; and a connector connectable with an image signal interface cable extending from the monitor unit, which is provided in the concave portion. Additionally, a computer, having computer equipment connectable with a monitor unit, as generally described above, is also provided.

The invention can further comprise a connector connectable with a data communication interface extending from the monitor unit, which is provided in the concave portion. As the data communication interface, for example, a signal conductor for radio communication, and a signal conductor for transmitting and receiving the data of an image picked up by a CCD can be cited.

Also, the invention may further comprise a detachable input section which receives data input.

Further, the invention provides computer equipment which is portable by being folded, characterized by comprising a monitor for displaying an image; a main unit which stores an arithmetic section for processing the image; and a support portion for connecting the monitor to the main unit, and the support portion is capable of adjusting the distance between the monitor and the main unit and the angle of the monitor with respect to the main unit. For example, the support portion connected to the monitor is detachable from the main unit.

Also, this invention may further comprise first angle adjusting means interposed between the support portion and the main unit; and second angle adjusting means interposed between the support portion and the monitor. In this case, the second angle adjusting means can function as an opening/closing hinge when the computer equipment is folded.

Further, the present invention may also further comprise an input section for receiving data input, the input section being connected to the main unit so that the distance between the input section and the main unit is variable.

The present invention can also provide a monitor unit connectable to a main unit of computer equipment. This monitor unit is characterized by comprising a monitor body provided with a display screen; and an arm extending from the monitor body, and the arm has an interface function capable of being connected to the main unit to send an image signal to the monitor body; and a plurality of rotatable hinges. In this case, at least one of the hinges preferably connects one end of the arm to the main unit.

Also, this monitor unit further comprises a setting base which detachably accommodates the arm, and the setting base comprises a connector which receives a cable provided with the interface function; and a cable extending from the connector so as to be connectable to a desktop type computer equipment.

Additionally, the monitor body may also be further provided with a radio communication antenna.

Also, the present invention provides a monitor unit connectable to a main unit of computer equipment, characterized by comprising a monitor body provided with a display screen; an arm for supporting the monitor body when the monitor unit is connected to the main unit; and a base connectable to the main unit, and the arm is connected to the base by a rotatable hinge.

Additionally, the present invention can provide a monitor unit setting base. This setting base is a unit setting base for connecting a monitor unit connectable to a notebook type PC (Personal Computer) to a desktop type PC in place of the notebook type PC, characterized by comprising a receiving portion capable of receiving an arm extending from the monitor unit; and a connector capable of receiving an image signal interface cable extending from the monitor unit, which is provided in the receiving portion.

BRIEF DESCRIPTION OF THE DRAWINGS

Other aspects, features, and advantages of the present invention will become more fully apparent from the following detailed description, the appended claims, and the accompanying drawings in which:

FIG. 1 is a perspective view of a notebook type PC in accordance with a first embodiment, showing a state in which the lid of the notebook type PC is open;

FIG. 2 is a perspective view for illustrating a configuration for connection of a mainframe section and a liquid crystal monitor unit;

FIG. 3 is a perspective view for illustrating a configuration for connection of a mainframe section and a liquid crystal monitor unit;

FIG. 4 is a partially enlarged sectional view for illustrating a configuration of an arm and hinges;

FIG. 5 is a perspective view for illustrating a state in which a notebook type PC is pulled out to a keyboard side;

FIG. 6 is a perspective view showing a state in which a lid of the notebook type PC shown in FIG. 1 is closed;

FIG. 7 is a perspective view for illustrating a case where a separated liquid crystal monitor unit is used as an ordinary liquid crystal monitor for a PC;

FIG. 8 is a perspective view for illustrating a configuration of a notebook type PC in accordance with a second embodiment; and FIG. 9 is a perspective view for illustrating a state of another use of the notebook type PC shown in FIG. 8.

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Embodiments of the present invention will now be described in detail with reference to the accompanying drawings.

FIG. 1 is a perspective view of a notebook type PC in accordance with a first embodiment, showing a state in which the lid of the notebook type PC is open.

A notebook type PC (computer equipment) 10 shown in FIG. 1 to include a mainframe section (main unit) 12 provided with a keyboard (input section) 21, and a liquid crystal monitor unit (monitor unit) 13 provided with a display screen 22. The mainframe section 12 and liquid crystal monitor unit 13 are rotatably connected to each other via a first hinge 30 provided at a part in the width direction of the notebook type PC 10 at an edge 12e of the mainframe section 12 and an edge 13e of the liquid crystal monitor unit 13. Also, the notebook type PC 10 is provided with wireless LAN antennae (radio communication antennae) 23 in the upper portions of both sides 13s of the liquid crystal monitor unit 13. Further, although the details are not shown in the figure, the mainframe section 12 contains a CPU (control section, arithmetic section), hard disk, memory, battery, or the like.

For this notebook type PC 10, the angle of inclination of the liquid crystal monitor unit 13 with respect to the mainframe section 12 can be set freely by the first hinge 30 and a second hinge 31 provided near the center of the upper face of the mainframe section 12. Further, the liquid crystal monitor unit 13 can be removed from the mainframe body 12 by the user. The following is a detailed description of the configuration for connection of the mainframe section 12 and the liquid crystal monitor unit 13.

FIGS. 2 and 3 are perspective views for illustrating the configuration for connection of the mainframe section 12 and the liquid crystal monitor unit 13, in which the notebook type PC is viewed from the back side thereof. FIG. 4 is a partially enlarged sectional view for illustrating the configuration of an arm and the hinges.

As is shown in FIG. 2, the notebook type PC 10 is preferably constructed such that the mainframe section 12 and the liquid crystal monitor unit 13 are detachable from each other. The liquid crystal monitor unit 13 has a monitor body 41 provided with a display screen 22, a frame (base) 43 connected to the mainframe section 12, and an arm 42 for connecting the monitor body 41 to the frame 43. Further, the monitor body 41 and the arm 42 are rotatably connected to each other by the first hinge 30, and the frame 43 and the arm 42 are rotatably connected to each other by the second hinge 31. Although not shown in the drawings, a signal conductor for video signal (interface cable) and a signal conductor for wireless LAN (interface for data communication) are provided in the arm 42. From the end on the frame 43 side of the arm 42, a video signal connector 44 and a wireless LAN signal connector 45 extend.

On the other hand, on the upper face of the mainframe section 12 of the notebook type PC 10, a concave frame receiving portion 51 is formed to accommodate the frame 43 of the liquid crystal monitor unit 13. In the frame receiving portion 51, there are provided a connector receiver 52 for receiving the video signal connector 44 and a connector receiver 53 for receiving the wireless LAN signal connector 45.

In order to connect the liquid crystal monitor unit 13 to the mainframe section 12, as shown in FIG. 2, first of all, the frame 43 of the liquid crystal monitor unit 13 is put into the frame receiving portion 51 in the mainframe section 12, and convex portions 46 extending from the frame 43 of the liquid crystal monitor unit 13 are inserted into concave portions 54 in the mainframe section 12, and screws 47 are threadedly installed in holes 55 in the frame receiving portion 51 via holes 48 in the frame 43. Further, the video signal connector 44 extending from the lower end of the arm 42 of the liquid crystal monitor unit 13 is connected to the connector receiver 52 of the mainframe section 12, and the wireless LAN signal connector 45 is connected to the connector receiver 53 of the mainframe section 12. Thus, the liquid crystal monitor unit 13 is connected to the mainframe section 12 as shown in FIG. 3.

In this state, the video signal connector 44, the wireless LAN signal connector 45, or the like are exposed in the frame receiving portion 51 of the mainframe section 51. Therefore, the opening of the frame receiving portion 51 is covered with a cover 60 as shown in FIG. 3. Then, the cover 60 is fixed to the mainframe section 12 using screws 61. In place of the screws 61, hook type fixtures may be used. As described above, for the notebook type PC 10 of the first embodiment, the liquid crystal monitor unit 13 can be removed from or connected to the mainframe section 12 with ease. Therefore, the user who has purchased the notebook type PC 10 can connect or separate the liquid crystal monitor unit 13 to or from the mainframe section 12 by his/her own hands.

FIG. 4 is a partially enlarged sectional view of a portion near the arm 42 in the state in which the liquid crystal monitor unit 13 is connected to the mainframe section 12.

As shown in FIG. 4, the liquid crystal monitor unit 13 is connected to the mainframe section 12 via the arm 42 and the frame 43. Since the first hinge 30 and the second hinge 31 are provided, the liquid crystal monitor unit 13 can be caused to form various angles with the mainframe section 12 by turning the first hinge 30 and the second hinge 31 in the direction of arrow shown in FIG. 4. It is preferable that the connection strength of the first and second hinges 30 and 31 be adjusted so that the notebook type PC 10 can be used in the state in which the liquid crystal monitor unit 13 is set at a predetermined angle. In addition, an engaging portion can be provided or other fixing devices such as a latch can be used so that the liquid crystal monitor unit 13 can be fixed at a predetermined angle.

Furthermore, as shown in FIG. 4, the mainframe section 12 is formed with a slope portion 12m extending from a front end 51f of the frame receiving portion 51 toward an upper face 12t of the mainframe section 12. By providing the slope portion 12m in this manner, the arm 42 can be inclined further to the keyboard 21 side when the liquid crystal monitor unit 13 is pulled out to the keyboard 21 side.

FIG. 5 is a perspective view for illustrating a state in which the notebook type PC 10 is pulled out to the keyboard 21 side.

As is shown in FIG. 5, in this state of the notebook type PC 10, the first hinge 30 is turned, and the arm 42 is raised from the mainframe section 12. Further, the second hinge 31 is turned, and the liquid crystal monitor unit 13 is located on the keyboard 21 side as compared with the state shown in FIG. 1. As a result, the display screen 22 of the liquid crystal monitor unit 13 can be inclined upward so as to face the face of user positioned in front of the notebook type PC 10. At this time, since the lower edge 13e of the liquid crystal monitor unit 13 is located on the keyboard 21 side, the liquid crystal monitor unit 13 of the notebook type PC 10 can be inclined more than in the state shown in FIG. 1.

Also, in the case where the location where the notebook type PC 10 is installed is relatively narrow, for example, in the use in the state shown in FIG. 1, even when the liquid crystal monitor unit 13 cannot be opened wide with respect to the mainframe section 12, that is, when the liquid crystal monitor unit 13 cannot be inclined sufficiently upward so as to face the user's face (for example, when a front seat of a train exists on the back side of the display screen 22 of the liquid crystal monitor unit 13), the arm 42 is raised by turning the first hinge 30 and the second hinge 31 as shown in FIG. 5, so that the user can set the display screen 22 at an easy-to-see angle. Therefore, because of being usable in various places, the notebook type PC 10 is easy for the user to see.

The notebook type PC 10 can be folded into a small size like the ordinary notebook type PC. FIG. 6 is a perspective view showing a state in which the lid of the notebook type PC 10 shown in FIG. 1 is closed. When the notebook type PC 10 is not in use, the notebook type PC 10 in the state in which the arm 42 is stored in the frame receiving portion 51 as shown in FIG. 1 can be folded as shown in FIG. 6 like the ordinary notebook type PC by turning the first hinge 30 and by bringing the liquid crystal monitor unit 13 down to the keyboard 21 side. By making the notebook type PC 10 in the state shown in FIG. 6, the notebook type PC 10 can be carried easily, and also the display screen 22 and the keyboard 21 can be protected.

As is described above, for the notebook type PC 10, the liquid crystal monitor unit 13 can be separated from the mainframe section 12. Although the liquid crystal monitor unit 13 can be used by being connected to another mainframe section that is different from the mainframe section 12, it can be connected to an ordinary PC mainframe section that is not of a notebook type, and thus can be used as a liquid crystal monitor for a PC. The following will be a detailed description of a case where the liquid crystal monitor unit 13 is used as a liquid crystal monitor for a PC.

FIG. 7 is a perspective view for illustrating a case where the separated liquid crystal monitor unit 13 is used as an ordinary liquid crystal monitor for a PC.

The liquid crystal monitor 70 shown in FIG. 7 has the liquid crystal monitor unit 13 and a setting base 71 for receiving the liquid crystal monitor unit 13. The setting base 71 is provided with a frame receiving portion 72 for accommodating the frame 43 of the liquid crystal monitor unit 13 in the state shown in FIG. 2. Although not shown in the drawing, a connector receiver for receiving the video signal connector 44 is provided in the frame receiving portion 72. Also, a connector 74 is provided at the tip end of a signal conductor 73 extending from the connector receiver to the outside of the setting base 71.

The frame receiving portion 72 shown in FIG. 7 has a similar configuration to that of the frame receiving portion 51 shown in FIG. 2. Therefore, after the frame 43 of the liquid crystal monitor unit 13 is put into the frame receiving portion 72 shown in FIG. 7, the video signal connector 44 extending from the liquid crystal monitor unit 13 is connected to the connector receiver. Then, the opening of the frame receiving portion 72 is covered with a cover as in the case shown in FIG. 3. When the liquid crystal monitor 70 thus assembled is connected to a PC mainframe section, the connector 74 is connected to a video signal port provided on the PC mainframe section. Thus, the liquid crystal monitor 70 can be used like an ordinary display used by being connected to the PC mainframe section.

The shape of the setting base 71 is not subject to any special restriction. However, the setting base 71 is preferably constructed so that the liquid crystal monitor 70 does not fall down even if the liquid crystal monitor unit 13 is caused to form any angle with the setting base 71 by the turning of the first hinge 30 and the second hinge 31 of the liquid crystal monitor unit 13.

For the liquid crystal monitor 70 shown in FIG. 7, the wireless LAN connection is not made via the setting base 71. However, a wireless LAN connector can be provided in the frame receiving portion 72 of the setting base 71, and a wireless LAN signal conductor extending from the connector can be connected to the PC mainframe section.

As described above, in the first embodiment, the liquid crystal monitor unit 13 can be separated from the mainframe section 12, so that another new liquid crystal monitor unit having performance different from that of the liquid crystal monitor unit 13 can be connected to the mainframe section 12. Therefore, the user can upgrade the performance of the notebook type PC 10 by oneself. Also, the liquid crystal monitor unit 13 can be reused without being disposed of, so that wasteful wastes are less liable to be produced when the user introduces new equipment.

Second Embodiment

FIG. 8 is a perspective view for illustrating a configuration of a notebook type PC 10A in accordance with a second embodiment.

The configuration of the notebook type PC 10A shown in FIG. 8 differs from that of the notebook type PC 10 shown in FIG. 1 in that a keyboard 21A is slidable with respect to a mainframe section 12A and is removable therefrom. In the notebook type PC 10A, the same reference numerals are applied to the same elements as those of the notebook type PC 10 shown in FIG. 1, and the explanation of the elements is omitted.

For the notebook type PC 10A, the keyboard 21A and the mainframe section 12A are connected to each other via a connection base portion 26. Specifically, the keyboard 21A is slidably connected to the connection base portion 26 extending from the mainframe section 12A. The keyboard 21A is provided with an infrared transmitter receiver section 25 serving as an interface for transmitting an input signal of the keyboard 21A to the mainframe section 12A with infrared rays, and similarly the mainframe section 12A is provided with an infrared transmitter and receiver section 24 for receiving the signal.

The notebook type PC 10A can be used in the state as shown in FIG. 1 in which the keyboard 21A is in close contact with the mainframe section 12A. Also, it can be used in the state in which the keyboard 21A is slid to a position on the user side so that the user can use the keyboard 21A easily. When the keyboard 21A is pulled out and used, the distance between the user who uses the keyboard 21A and the liquid crystal monitor unit 13 increases, so that it is difficult for the user to see the liquid crystal monitor unit 13. Therefore, as shown in FIG. 8, the liquid crystal monitor unit 13 is erected and pulled nearer to the user, which makes the notebook type PC 10A easier to use.

FIG. 9 is a perspective view for illustrating a state of another use of the notebook type PC 10A shown in FIG. 8.

For the notebook type PC 10A shown in FIG. 8, the keyboard 21A can be used in a state of being pulled nearer to the user and being completely separated from the connection base portion 26 as shown in FIG. 9. In this case, the keyboard 21A is used in a range in which a signal can be transmitted from the infrared transmitter receiver section 25 of the keyboard 21A to the infrared transmitter receiver section 24 of the mainframe section 12A.

As is described above, in the second embodiment, the position and angle of the liquid crystal monitor unit 13 with respect to the mainframe section 12A can be changed according to a change in position of the keyboard 21A. Therefore, in the use of the notebook type PC 10A, the difficulty in seeing the liquid crystal monitor unit 13 caused by the change in position of the keyboard 21A can be eliminated, so that the user can use the notebook type PC 10A comfortably. For the notebook type PC 10A, when the area for installing the notebook type PC 10A is small, the notebook type PC 10A can be used by installing the keyboard 21A in a different place, for example, on the user's lap or by holding the keyboard 21A by hand. Therefore, the notebook type PC 10A of the second embodiment can be used in a wider variety of places as compared with the first embodiment.

In the second embodiment, the configuration may be such that the keyboard 21A is not separated completely from the mainframe section 12A unlike the configuration shown in FIG. 9. In this case, the transmission and reception of a signal between the keyboard 21A and the mainframe section 12A are preferably accomplished via a signal conductor provided in the connection base portion 26.

Also, in the second embodiment, the transmission and reception of a signal between the keyboard 21A and the mainframe section 12A may be accomplished by using means other than infrared rays. For example, radio transmission etc. can also be used.

In the above-described embodiments, the liquid crystal monitor unit 13 can be provided with a function of a TV camera, microphone, speaker, light, or the like together with or in place of the wireless LAN antenna 23.

Also, in the mainframe sections 12 and 12A of the notebook type PCs 10 and 10A of the first and second embodiments, a CPU, a hard disk, or the like are stored in a place other than the place where the frame receiving portion 51, 72 for receiving the stored arm 42 is stored. However, these elements may be stored under the frame receiving portion 51, 72.

Furthermore, although the monitor for displaying an image uses a liquid crystal monitor in the first and second embodiments, the monitor is not limited to this type in the present invention, and any type of monitor that can display an image on portable computer equipment can be used.

Additionally, the configuration described in the above-described embodiments is but exemplary. It will be further understood that various changes in the details, materials, configurations and arrangements of the parts which have been described and illustrated in order to explain the nature of this invention may be made by those skilled in the art without departing from the principle and scope of the invention as expressed in the following claims.

What is claimed is:

1. Computer equipment which is connectable with a monitor unit and portable, comprising:

a concave portion capable of storing an arm which is rotatably connected to said monitor unit wherein said arm portion has a width less than a monitor unit width of said monitor unit; and a connector connectable with an image signal interface cable extending from said monitor unit, which is provided in said concave portion.

2. The apparatus according to claim 1, further comprising a connector connectable with a data communication interface extending from said monitor unit, which is provided in said concave portion.

3. The apparatus according to claim 1, further comprising a detachable input section which receives data input.

4. A monitor unit setting base for connecting a monitor unit connectable to a notebook type PC (Personal Computer) to a desktop type PC in place of said notebook type PC, comprising: a receiving portion capable of receiving an arm extending from said monitor unit wherein said receiving portion has a width less than a monitor width of said monitor unit; and a connector capable of receiving an image signal interface cable extending from said monitor unit, which is provided in said receiving portion.

* * * * *